(12) United States Patent
Fujii

(10) Patent No.: US 6,815,935 B2
(45) Date of Patent: Nov. 9, 2004

(54) POWER SUPPLY

(75) Inventor: Masashi Fujii, Saitama (JP)

(73) Assignee: Citizen Watch Co., Ltd., Tokyo (JP)

(*) Notice: Subject to any disclaimer, the term of this patent is extended or adjusted under 35 U.S.C. 154(b) by 33 days.

(21) Appl. No.: 10/381,205

(22) PCT Filed: Sep. 28, 2001

(86) PCT No.: PCT/JP01/08528
§ 371 (c)(1),
(2), (4) Date: Mar. 27, 2003

(87) PCT Pub. No.: WO02/27905
PCT Pub. Date: Apr. 4, 2002

(65) Prior Publication Data
US 2004/0027099 A1 Feb. 12, 2004

(30) Foreign Application Priority Data
Sep. 28, 2000 (JP) .......................... 2000-295943

(51) Int. Cl.⁷ .............................................. G05F 1/40
(52) U.S. Cl. ...................................... 323/272; 323/268
(58) Field of Search ................................ 323/268, 269, 323/271, 272, 273, 275

(56) References Cited

U.S. PATENT DOCUMENTS

| 4,502,152 A | 2/1985 | Sinclair | |
|---|---|---|---|
| 4,858,196 A | * 8/1989 | Hein | 365/229 |
| 5,034,676 A | * 7/1991 | Kinzalow | 323/268 |
| 5,365,305 A | * 11/1994 | Seki et al. | 396/279 |
| 5,787,294 A | 7/1998 | Evoy | |
| 6,127,816 A | 10/2000 | Hirst | |
| 6,150,798 A | 11/2000 | Ferry et al. | |
| 6,404,653 B1 | * 6/2002 | Chitsazan et al. | 363/16 |

FOREIGN PATENT DOCUMENTS

| EP | 0 903 839 A1 | 3/1999 |
|---|---|---|
| GB | 2 243 961 A | 11/1991 |
| GB | 2310570 A | 8/1997 |
| JP | 5-260727 | 10/1993 |
| JP | 11-178223 | 7/1999 |

* cited by examiner

Primary Examiner—Matthew V. Nguyen
(74) Attorney, Agent, or Firm—Westerman, Hattori, Daniels, Adrian, LLP

(57) ABSTRACT

A power supply in which power conversion efficiency is enhanced in all operation modes by supplying power to a load (60) from any one or both of first power supply circuit (20) and second power supply circuit (40), detecting the operation mode of the load (60) through an operation mode detecting means (65), and controlling switches (11,12) depending on the operation mode of the load (60) to select a power supply circuit for supplying power to the load (60).

6 Claims, 6 Drawing Sheets

POWER SUPPLY

TECHNICAL FIELD

The invention relates to a power supply particularly to a power supply for supplying power to a load of a portable equipment using a battery.

BACKGROUND TECHNOLOGY

Various portable equipment such as a cellular phone, a portable computer, a portable tape recorder, a portable CD player, and an electronic notepad have been used, and there are desired a battery which is small and light and is capable of supplying power for a long time, and a power supply using the same.

An example of conventional portable equipment which is built in such a power supply is shortly described with reference to FIG. 6. According to the portable equipment, power is supplied to a load 60 by a power supply consisting a battery 10 and a power supply circuit 15 which is serially connected with the battery 10.

A load 60 comprises a CPU (Central Processing Unit) 61, a ROM (Read Only Memory) 62, an LCD (Liquid Crystal Display) 63, an input device 64 such as a keyboard or the like, a RAM (Random Access Memory) 66 and an RTC (Real Time Clock) 67.

There are three types of operation modes of the load 60, namely, a so-called full mode or normal mode where all the CPU 61, ROM 62, LCD 63, input device 64, RAM 66, and RTC 67 operate, a so-called idle mode or sleep mode where a part of the CPU 61 and the LCD 63, RAM 66 and RTC 67 operate, and a so-called stop mode where only the RAM 66 and RTC 67 operate.

There is a difference between the current consumption in the full mode where all the components of the load operate and the current consumption in the stop mode where only the RAM 66 and RTC 67 operate in the order of several hundreds to several thousands.

For example, current consumption of a certain model of a card type PDA (Personal Digital Assistant) manufactured by Citizen Watch Co., LTD. is 10 mA in the full mode, while it is several tens $\mu$A in the stop mode.

A power supply circuit type is generally classified into a switching regulator circuit type and a linear regulator circuit type. A power supply circuit of the portable equipment generally employs the switching regulator circuit type so as to extend the battery life, so that the maximum power conversion efficiency is obtained in the full mode where all the components of the load operate or in the idle mode of a standby state. However, in a state such as the stop mode where the load is very small, the linear regulator circuit type which does not use an oscillator for pulse width modulation is small in quiescent current of the power supply circuit per se, thereby enhancing power conversion efficiency.

The power supply circuit 15 in FIG. 6 converts an input voltage and input current from the battery 10 into an output voltage and output current suitable for the load 60 and supplies to the same. The power supply circuit 15 of the conventional portable equipment employs the power supply circuit of the switching regulator circuit type so as to supply power to the load 60 so that the maximum power conversion efficiency is obtained in the full mode operating all the components of the load 60 or the idle mode.

However, the quiescent current of the switching regulator circuit type power supply circuit is several tens to several hundreds times as large as that of the linear regulator circuit type power supply circuit. Therefore, the current consumption of the power supply circuit per se becomes larger than current consumption of the load during the stop mode, so that it is not always sure that power conversion efficiency is the maximum in all operation modes.

DISCLOSURE OF THE INVENTION

The invention has been developed to solve the foregoing problems, and it is an object of the invention to provide a power supply capable of reducing current consumption of a power supply circuit per se during a stop mode to enhance power conversion efficiency, thereby obtaining the maximum power conversion efficiency in all operation modes.

To achieve the above object, a power supply of the invention comprising, a power supply circuit connected with the battery for supplying power to a load, wherein the power supply circuit consists of a plurality of power supply circuits which are connected in parallel with one another.

The power supply unit further comprises an operation mode detecting means for detecting an operation mode of the load, and a power supply circuit selecting means for switching any one of or multiple combinations of the plurality of power supply circuits for supplying power to the load depending on the operation mode detected by the operation mode detecting means.

The load is provided with a CPU, and the operation mode detecting means consists of the CPU per se, or a detecting means for the operation mode of the load in response to a signal representing the operation state of the CPU.

It is preferable that the plurality of power supply circuits mentioned above are differentiated in a circuit type or power supply characteristics. For example, it is preferable that the plurality of power supply circuits comprise a first power supply circuit which is a switching regulator circuit type and a second power supply circuit which is a linear regulator circuit type, and when the operation mode of the load is a full mode or an idle mode, power is supplied to the load by the first and second power supply circuits, while the operation mode is a stop mode, power is supplied to the load by the second power supply circuit alone.

According to the power supply of the invention having the foregoing construction, it is possible to supply power to the load by selecting the power supply circuit or the combination of the plurality of the power supply circuits either of which obtain the maximum power conversion efficiency depending on the operation mode of the load. Accordingly, it is possible to improve power conversion efficiency in the all operation modes, for example, by reducing current consumption of the power supply circuit per se during a stop mode.

BEST MODE FOR CARRYING OUT THE INVENTION

Hereinafter, embodiments of the invention will be described in detail with reference to the attached drawings.
First Embodiment: FIG. 1 to FIG. 4

Figure 1:
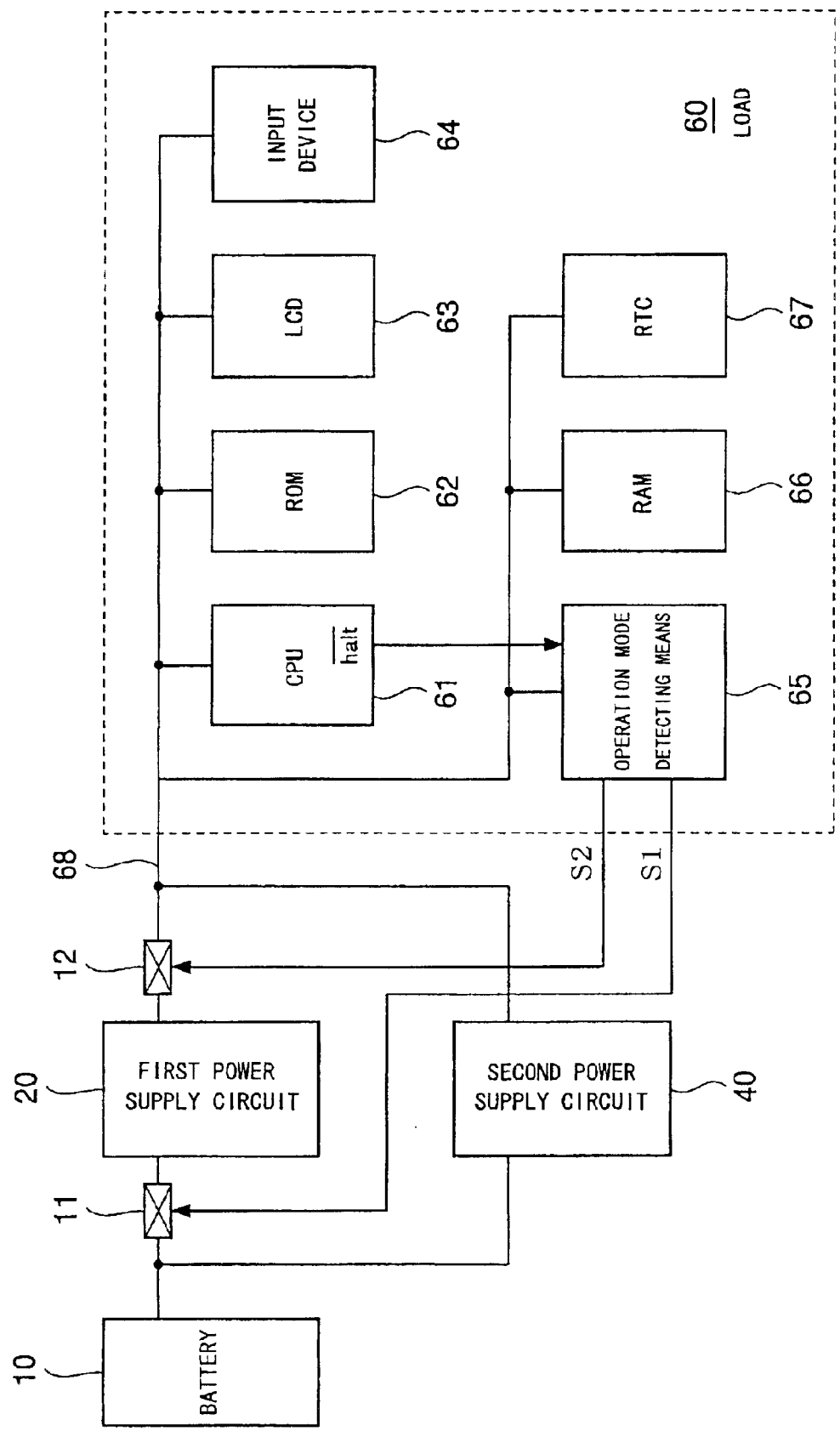
FIG. 1 is a block diagram of a portable equipment with a power supply showing a first embodiment of the invention.
Figure 6:
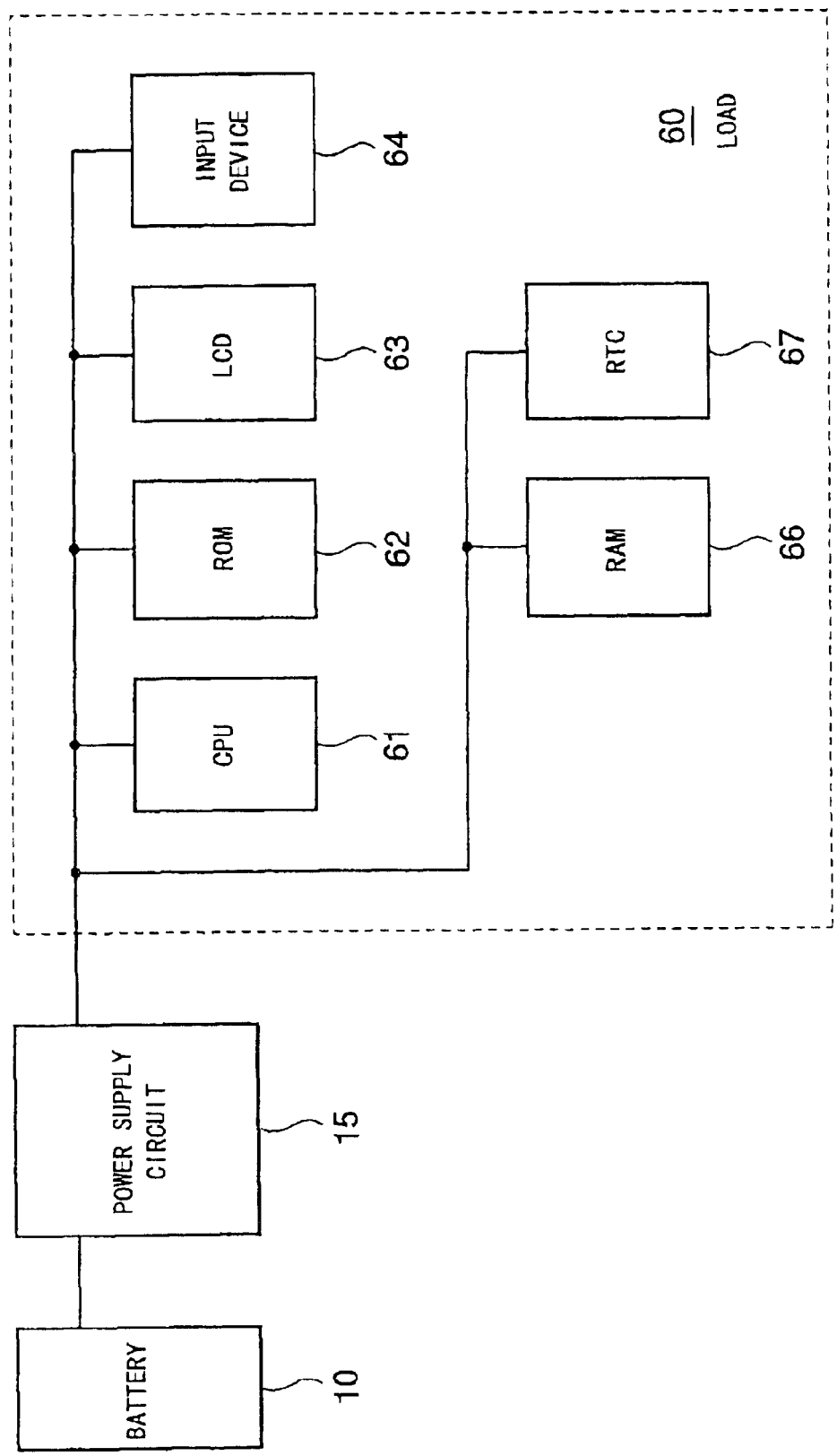
FIG. 6 is a block diagram showing an example of a portable equipment with a conventional power supply.

FIG. 1 is a block diagram of a portable equipment with a power supply showing a first embodiment of the invention, and components which are the same as those of the conventional example shown in FIG. 6 are depicted by the same reference numerals and the explanation thereof is omitted.

The power supply of the portable equipment shown in FIG. 1 comprises a battery 10, a first power supply circuit 20 connected with the battery 10, a second power supply circuit 40 which is connected with the battery 10 and also may be connected in parallel with the first power supply circuit 20, a first switch 11 provided at the input side of the first power supply circuit 20, and a second switch 12 provided at the output side of the first power supply circuit 20. The power supply further comprises an operation mode detecting means 65 for detecting an operation mode of a load 60, and an ON/OFF state of the first switch 11 and the second switch 12 is controlled by signals S1, S2 representing the result of detection of the operation mode by the operation mode detecting means 65.

The second power supply circuit 40 is always serially connected between the battery 10 and the load 60 without intervening the first and second switches 11, 12.

Figure 2:
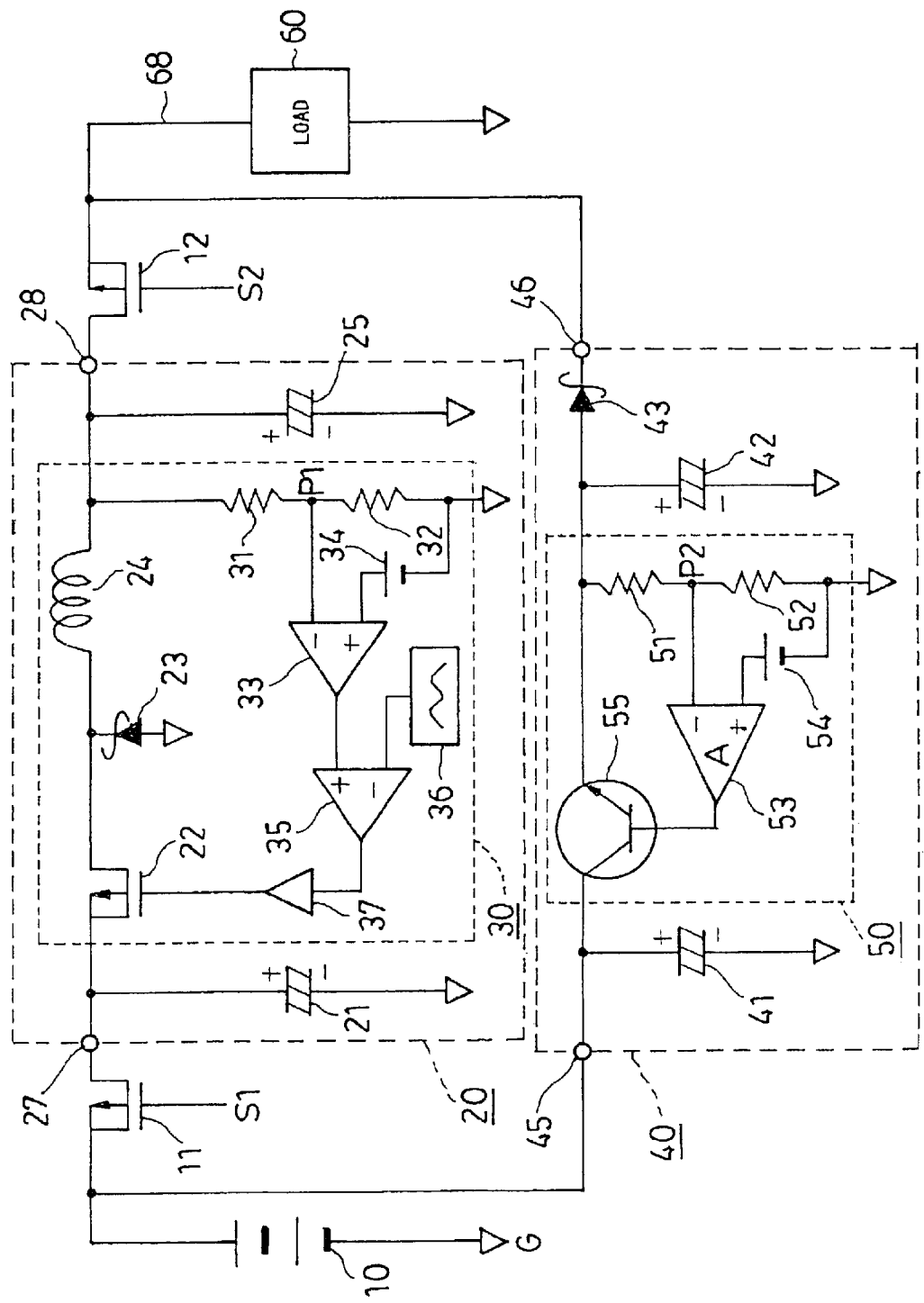
FIG. 2 is a circuit diagram showing the concrete examples of the first and second power supply circuits shown in FIG. 1.

FIG. 2 is a circuit diagram showing concrete examples of the first power supply circuit 20, second power supply circuit 40, the first switch 11 and the second switch 12 as shown in FIG. 1. In this circuit diagram, small triangular symbols directed downward show common ground (earth) G.

The first power supply circuit 20 is a power supply circuit provided with a switching regulator circuit 30 between an input terminal 27 and an output terminal 28 thereof, and it includes an input capacitor 21 connected between the input terminal 27 and the ground, and also a smoothing capacitor 25 connected between the input terminal 27 and the ground.

The input terminal 27 of the first power supply circuit 20 is connected with an positive pole of the battery 10 via the first switch 11, while the output terminal 28 thereof is connected with a power supply line 68 extending to the load 60 via the second switch 12.

In the switching regulator circuit 30, drain/source of a p-channel FET 22 and a choke coil 24 are serially connected with each other between the input terminal 27 and the output terminal 28 while the drain of the FET 22 is connected with the input terminal 27. A flywheel diode 23 consisting of a Schottky barrier diode is provided between a connecting point of the source of the FET 22 with the choke coil 24 and the ground, an anode thereof is connected with the ground.

Further, the switching regulator circuit 30 comprises a voltage divider circuit consisting of voltage divider resistors 31, 32 which are serially connected with each other between the output terminal 28 and the ground, a reference voltage supply 34, a difference amplifier 33 for detecting a difference between a voltage at a voltage dividing point P1 of the voltage divider circuit and a reference voltage by the reference voltage supply 34, a triangular wave oscillator 36 for generating triangular wave voltage, a pulse-width modulation comparator 35 for subjecting the output voltage of the difference amplifier 33 to a pulse-width modulation by the triangular wave voltage, and a driving circuit 37 for ON/OFF driving the FET 22 by controlling a gate of the FET 22 in response to an output pulse signal.

Meanwhile, the second power supply circuit 40 is a power supply circuit having a linear regulator circuit 50 between an input terminal 45 and an output terminal 46 thereof, and a backflow prevention diode 43 consisting of a Schottky barrier diode is provided between an output side of the linear regulator circuit 50 and the output terminal 46, a cathode thereof is connected with the output terminal 46. An input capacitor 41 is provided between the input terminal 45 and the ground and a smoothing capacitor 42 is connected between the output terminal 46 and the ground respectively.

The input terminal 45 of the second power supply circuit 40 is directly connected with the positive pole of the battery 10, while the output terminal 46 is directly connected with the power supply line 68 extending to the load 60.

The linear regulator circuit 50 comprises a series pass transistor 55, a voltage divider circuit consisting of voltage divider resistors 51, 52 which are serially connected with each other, a difference amplifier 53, and a reference voltage supply 54.

A collector of the series pass transistor 55 is connected with the input terminal 45, while an emitter thereof is connected with an anode of the backflow prevention diode 43. The voltage divider circuit consisting of voltage divider resistors 51, 52 is connected between the emitter of the series pass transistor 55 and the ground, and a difference between the voltage at a voltage dividing point P2 of the voltage divider circuit and a reference voltage of the reference voltage supply 54 is detected by the difference amplifier 53, and an output voltage corresponding to the difference therebetween is applied to a base of the series pass transistor 55, thereby controlling the conductivity.

In the power supply of the invention, the second power supply circuit 40 divides an output voltage supplied from the output terminal 46 to the load 60 by the voltage divider resistors 51, 52. The voltage at the voltage dividing point P2 and the reference voltage of the reference voltage supply 54 (a voltage corresponding to the voltage at the voltage dividing point P2 when the output voltage has a predetermined value) are inputted to the difference amplifier 53, and the difference therebetween is amplified and inputted to the base of the series pass transistor 55, thereby driving the series pass transistor 55. An emitter output of the series pass transistor 55' becomes an output voltage to be supplied to the load 60. Accordingly, a value of the current flowing through the series pass transistor 55 is controlled so that the output voltage is equal to a predetermined value.

The first power supply circuit 20 divides the output voltage to be supplied to the load 60 by the voltage divider resistors 31, 32, and the voltage at the voltage dividing point P1 thereof and the reference voltage of the reference voltage supply 34 (a voltage corresponding to the voltage at the voltage dividing point P1 when the output voltage as a predetermined value) are inputted to the difference amplifier 33, and the difference therebetween is amplified.

The difference voltage amplified by the difference amplifier 33 and the triangular wave voltage of the triangular wave oscillator 36 are inputted to the pulse-width modulation comparator 35, and a pulse signal (pulse-width modulation signal) which is synchronous with an oscillation frequency of a triangular wave oscillator 36 and has a pulse width corresponding to a difference voltage is outputted. The driving circuit 37 switches the FET 22 in response to the pulse signal, and interrupts drain/source current.

The drain/source current is rectified by the flywheel diode 23 and is smoothed by the choke coil 24 and smoothing capacitor 25, thereby forming an output voltage from the output terminal 28.

The current consumption of the first power supply circuit 20 is the sum of the load current of the load 60 and current consumption in the self-circuit, namely, the current consumption of the voltage divider resistors 31, 32, difference amplifier 33, pulse-width modulation comparator 35, triangular wave oscillator 36, and driving circuit 37.

Meanwhile, the current consumption of the second power supply circuit 40 is the sum of the load current of the load 60 and current consumption in the self-circuit, namely, the current consumption of the voltage divider resistors 51, 52 and difference amplifier 53.

The current consumption of the first power supply circuit 20 and that of the second power supply circuit 40 are different from each other in quiescent current such that current consumption of the first power supply circuit 20 is larger than that of the second power supply circuit 40 by the quiescent current of the triangular wave oscillator 36, pulse-width modulation comparator 35 and driving circuit 37. That is, the quiescent current of the first power supply circuit 20 consisting of a switching regulator circuit is larger than that of the second power supply circuit 40 consisting of a linear regulator circuit.

The first power supply circuit 20 can supply a large current or power, while the second power supply circuit 40 merely supplies a small current or power.

The function of the operation mode detecting means 65 provided in the load 60 of the portable equipment shown in FIG. 1 is now described with reference to a flowchart in FIG. 3.

The operation mode detecting means 65 always monitors a /halt signal serving as an operation state signal of the CPU 61 during the operation of the load 60. The CPU 61 renders the /halt signal high (HI) when it normally operates the load 60 in a full mode (normal mode) or allows the load 60 to stand by in an idle mode (sleep mode), while the CPU 61 renders the /halt signal low (LO) when it stops the load 60 in a stop mode so as to operate only the RAM 66 and the RTC (clock generation circuit) 67.

Figure 3:
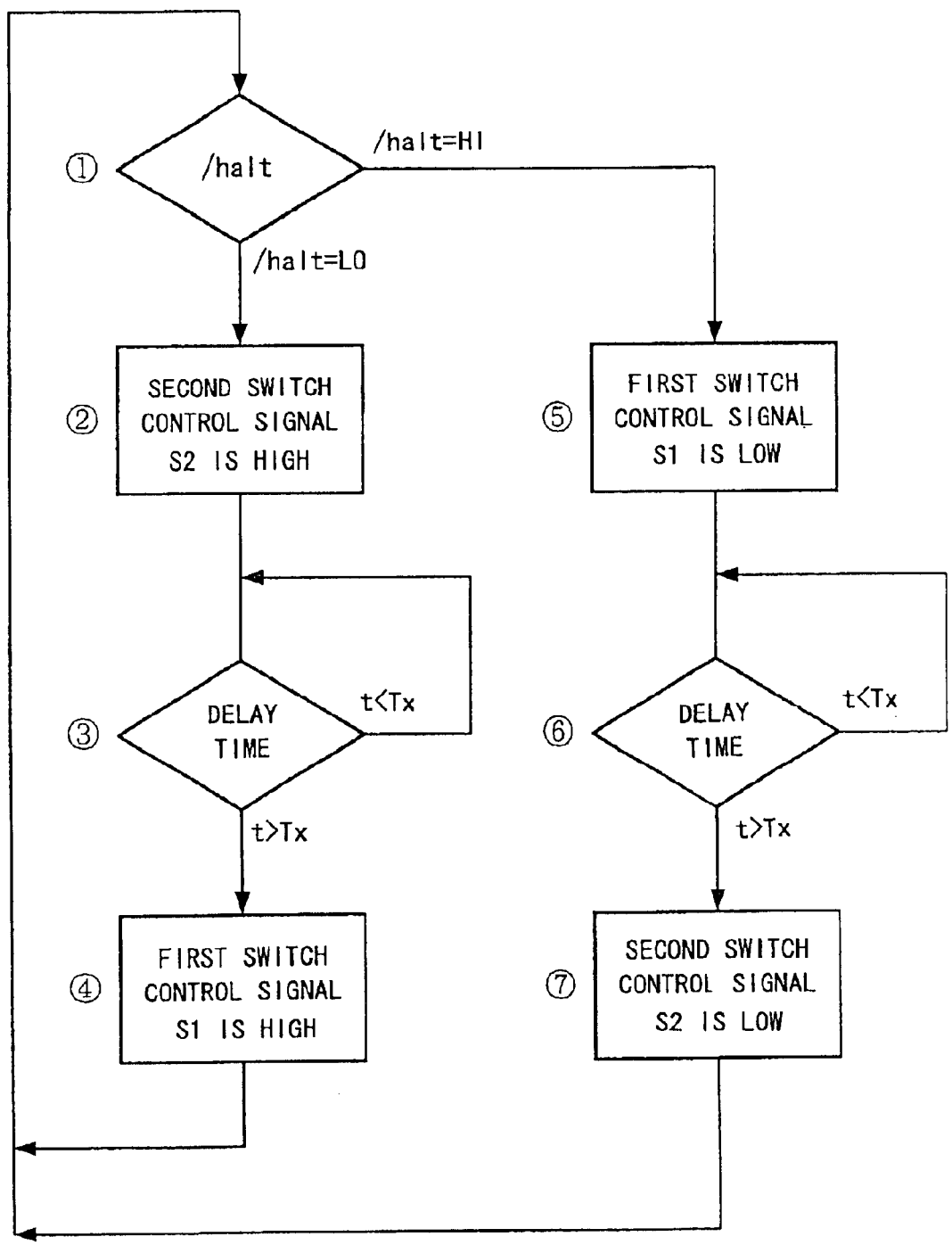
FIG. 3 is a flow chart showing the function of the operation mode detecting means shown in FIG. 1.

Accordingly, the operation mode detecting means 65 executes operations shown in the flowchart in FIG. 3 repeatedly during supplying power to the load 60.

That is, the operation mode detecting means 65 decides whether the /halt signal from the CPU 61 is high or low in step 1 and it renders the second switch control signal S2 high in step 2 if the /halt signal is low. As a result, the second switch 12 formed of the p-channel FET shown in FIGS. 1 and 2 is turned OFF because a gate thereof becomes high. Thereafter, the operation mode detecting means 65 waits the elapse of a delay time Tx in step 3, and it renders the first switch control signal S1 high in step 4 when the delay time Tx elapses, then the program returns to step 1. When the first switch control signal S1 is rendered high, the first switch 11 formed of the p-channel FET is turned OFF.

If the /halt signal is high in step 1, the program goes to step 5 where the first switch control signal S1 is rendered low. As a result, the first switch 11 is turned ON because the gate thereof is rendered low. Thereafter, the operation mode detecting means 65 waits the elapse of the delay time Tx in step 6, and it renders the second switch control signal S2 low in step 7 when the delay time Tx elapses, then the program returns to step 1. When the second switch control signal S2 is rendered low, the second switch 12 is turned ON.

Accordingly, the operation mode detecting means 65, the first switch 11 and the second switch 12 serve as the power supply circuit selecting means by switching between the power supply circuits or the combination thereof depending on the operation mode of the load 60, so as to supply power to the load 60 by the second power supply circuit 40 (at the time of stop mode) alone or by both the first power supply circuit 20 and the second power supply circuit 40 (at the time of full mode or idle mode).

Although according to the first embodiment of the invention, the operation mode detecting means 65 is provided separately from the CPU 61 so as to easily understand the function of the operation mode detecting means, it is sufficient that the processings shown in FIG. 3 are executed by the CPU 61 per se, and the first switch control signal S1 and the second switch control signal S2 may be outputted through an interface circuit (not shown).

Figure 4:
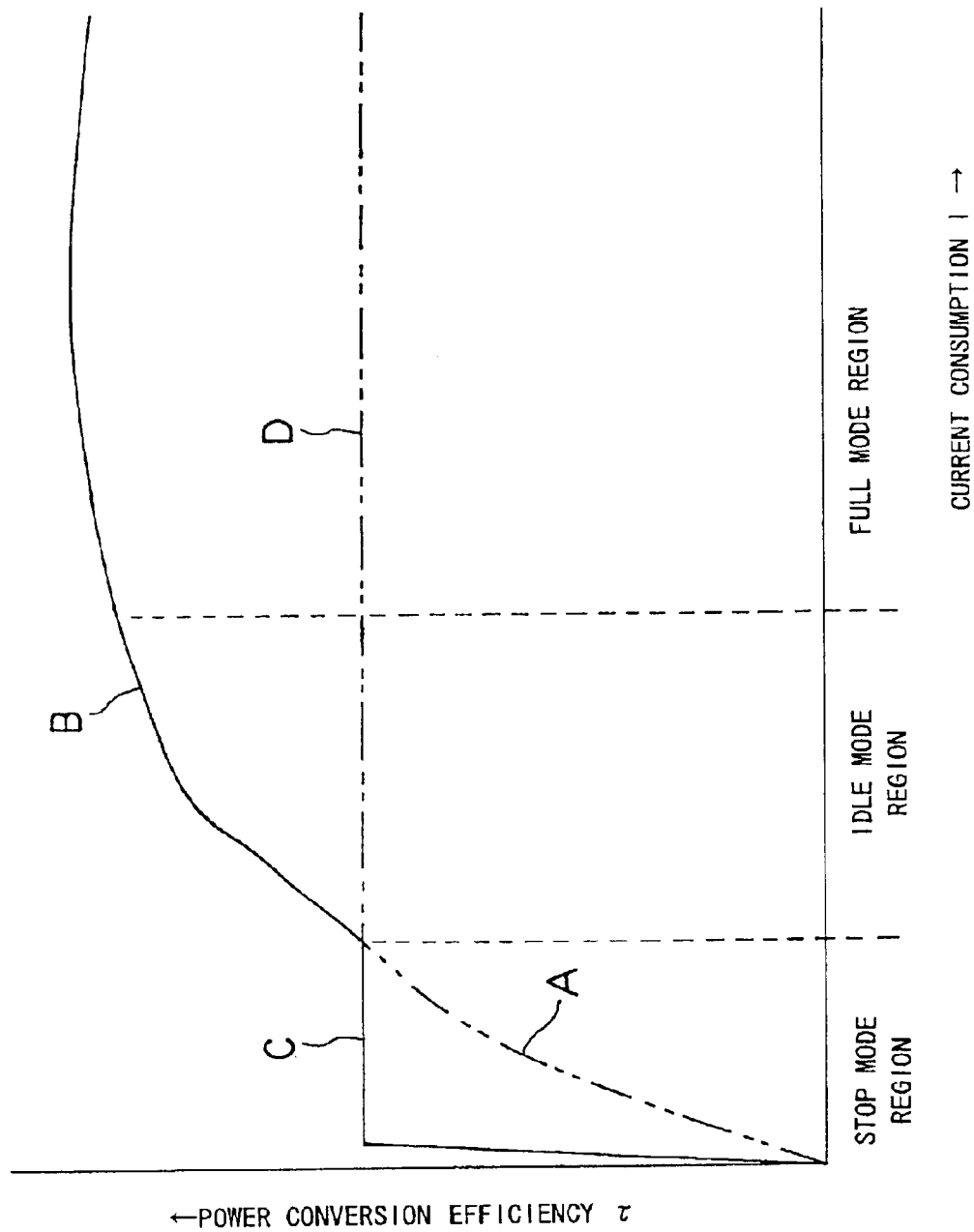
FIG. 4 is a diagram showing power conversion efficiency relative to a current consumption of the power supply unit shown in FIG. 2.

Described next with reference to FIG. 4 is power conversion efficiency relative to the current consumption of the power supply of the invention.

In FIG. 4, a chain double-dashed line A shows power conversion efficiency relative to current consumption in a stop mode region by the first power supply circuit 20, and a solid line B shows power conversion efficiency relative to the current consumption in an idle mode region and a full mode region. A solid line C shows power conversion efficiency relative to current consumption in the stop mode region by the second power supply circuit 40, and a chain double-dashed line D shows power conversion efficiency relative to the current consumption in the idle mode region and the full mode region.

Although power is supplied to the load 60 by both the first power supply circuit 20 and the second power supply circuit 40 in the idle mode region and the full mode region in the above-mentioned embodiment, most of the power is supplied to the load by the first power supply circuit 20 having an excellent power conversion efficiency. However, when the operation mode of the load 60 is in a stop mode region, the first power supply circuit 20 which is large in quiescent current is separated from the second power supply circuit 40, and the power is supplied to the load 60 by only the second power supply circuit 40 having excellent power conversion efficiency due to small quiescent current.

Accordingly, the power conversion efficiency relative to the current consumption in the all operation mode regions of the load 60 is always excellent as shown in solid lines C and B in FIG. 4.

Meanwhile, in the first embodiment, the reason why the switches 11, 12 are provided at the input and output sides of the first power supply circuit 20 is that the supply of power to the load 60 from the first power supply circuit 20 is interrupted by turning OFF the second switch 12, thereby preventing the spread of output voltage of the second power supply circuit 40, while the supply of power to the first power supply circuit 20 is interrupted by turning OFF the first switch 11, thereby eliminating current consumption in the internal circuit.

It is possible to switch over the first power supply circuit 20 by the first switch 11 alone by providing the backflow prevention diode at the output side of the first power supply circuit 20 instead of the second switch 12. However in that case, when power is supplied from the first power supply circuit 20 to the load 60, there arises a problem of voltage drop caused by a forward resistance of the backflow prevention diode. The voltage drop can not be neglected if the load current becomes large.

For example, since the forward resistance of the backflow prevention diode is about 20 $\Omega$, if the load current is 5 mA, there occurs a voltage drop of 0.1 V (obtained by 20×0.05= 0.1 V).

Figure 5:
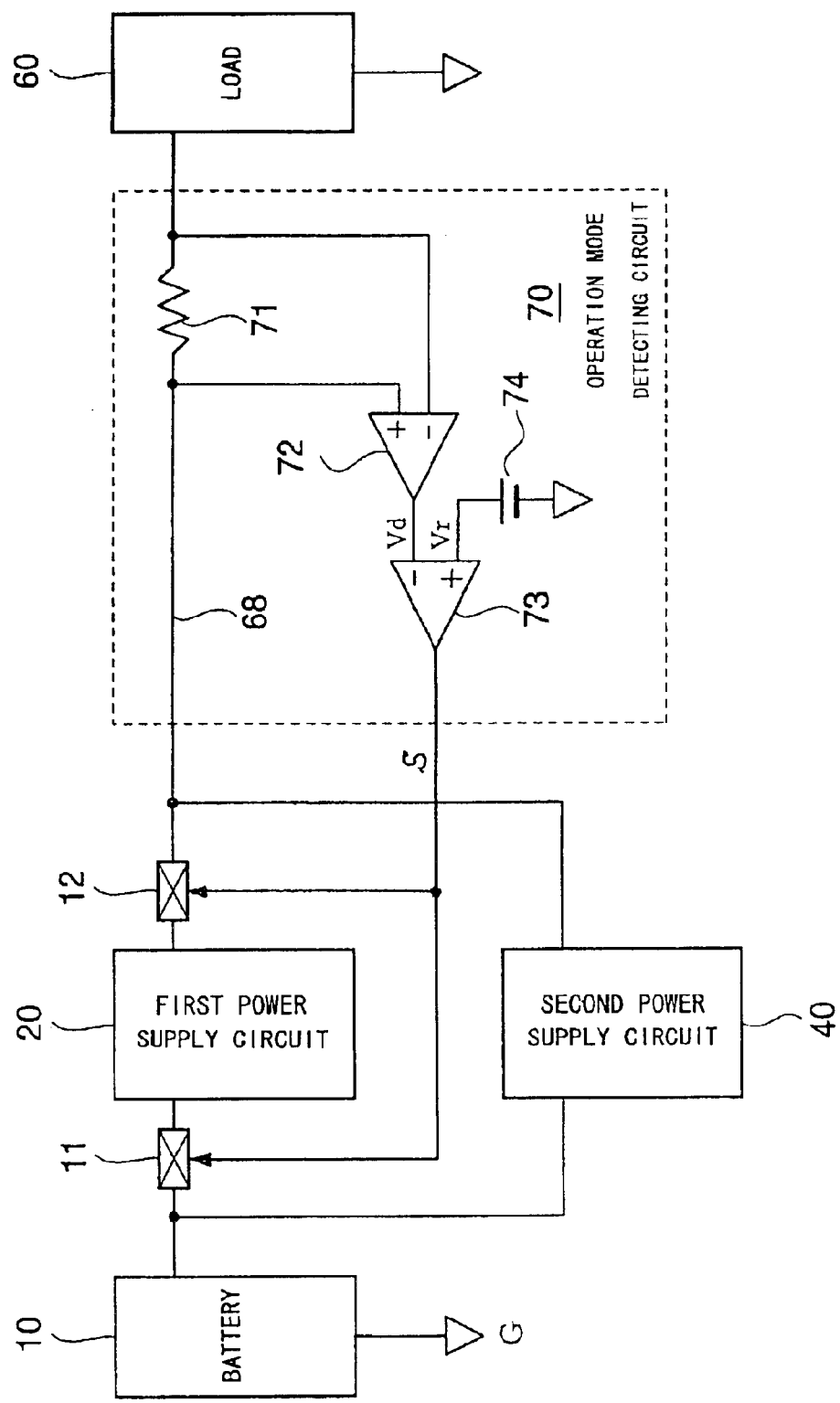
FIG. 5 is a block diagram of a portable equipment with a power supply showing a second embodiment of the invention.

Second Embodiment: FIG. 5

A second embodiment of a power supply according to the invention is now described with reference to FIG. 5.

The second embodiment of the invention is different from that of the first embodiment in that the operation mode detecting means for detecting the operation mode of a load 60 is not provided inside the load 60 but provided separately from the load 60, and hence explanations of other construction and operation are omitted.

The operation mode detecting means of the portable equipment shown in FIG. 5 consists of an operation mode detecting circuit 70, which comprises a shunt resistor 71 which is interposed in a power supply line 68 for supplying power from a first power supply circuit 20 and a second power supply circuit 40 to the load 60, an operational amplifier 72 for detecting a current flowing into the load 60 as a potential difference between both ends of the shunt resistor 71, and a comparator 73 for comparing a detected voltage Vd detected by the operational amplifier 72 with a reference voltage Vr set by a reference voltage supply 74. An output terminal of the comparator 73 is connected with respective gates of a first switch 11 and a second switch 12 respectively formed of a p-channel FET.

When the voltage Vd detected by the operational amplifier 72 of the operation mode detecting circuit 70 is not less than the preset reference voltage Vr set by the reference voltage supply 74, the comparator 73 renders an output signal S to low level as considering that the operation mode of the load 60 is a full mode or an idle mode, thereby rendering respective gates of the first and second switches 11, 12 respectively consisting of p-channel FET to low and turning ON the first and second switches 11, 12.

Accordingly, when the load 60 operates in the full mode or idle mode, the first power supply circuit 20 is connected in parallel with the second power supply circuit 40 to supply power to the load 60, but almost of the power is supplied to the load 60 by the first power supply circuit 20 which is higher in power conversion efficiency.

Meanwhile, when the voltage Vd detected by the operational amplifier 72 of the operation mode detecting circuit 70 is not more than the reference voltage Vr, the comparator 73 renders an output signal S to high level as considering that the operation mode of the load 60 is a stop mode, thereby rendering the respective gates of the first and second switches 11, 12 respectively consisting of p-channel FET to high and turning OFF both the first and second switches 11, 12.

Accordingly, the first power supply circuit 20 is separated from the second power supply circuit 40 when the load 60 halts in the stop mode so that power is supplied to the load 60 by the second power supply circuit 40 alone. In the stop mode region, the second power supply circuit 40 is small in quiescent current and hence the power conversion efficiency is high.

In this embodiment, there is no practical problem to simultaneously turn ON or OFF the first switch 11 and the second switch 12 by the same signal. However, a rise delay circuit may be provided between an output terminal of the comparator 73 and the first switch 11, and a fall delay circuit may be provided between the output terminal of the comparator 73 and the second switch 12, respectively. With such an arrangement, the second switch 12 can be turned OFF earlier than the first switch 11 when the first power supply circuit 20 is separated from the second power supply circuit 40, while the first switch 11 is turned ON earlier than the second switch 12 when the first power supply circuit 20 is connected with the second power supply circuit 40.

MODIFIED EXAMPLE

In each embodiment of the invention mentioned above, although a p-channel FET is used as the first switch 11 and the second switch 12, an n-channel FET, other switching elements, contact relay or the like can be used. Further, as has been described, it is possible to replace the second switch with a backflow prevention diode.

The means for detecting the operation mode of the load is not limited to the operation mode detecting means set forth above, and it can be realized, for example, by detecting a display/non-display signal relative to an LCD or detecting a state of operation mode if there is a switch or signal for switching the operation mode.

In each embodiment mentioned above, although the power supply is comprised of two power supply circuits which are different in circuit type and power supply capacity, it may be comprised of not less than three power supply circuits which are different in circuit type and power supply capacity, and power may be supplied to the load by any one of or multiple combinations of the power supply circuits which are switched depending on the operation mode of the load.

INDUSTRIAL APPLICABILITY

The power supply of the invention has a plurality of power supply circuits, and one of or multiple combinations of them are switched depending on the operation mode of a load, thereby supplying power to the load, so that a power supply circuit which is optimum to the operation mode of the load can be selected and wasteful current consumption in the power supply circuit per se can be reduced, and the power conversion efficiency can be enhanced.

Accordingly, power consumption of the various portable equipment can be restrained, thereby extending lifetime of a battery.

What is claimed is:

1. A power supply comprising:
   a battery;
   a power supply circuit connected with the battery for supplying power to a load with CPU, wherein the power supply circuit consists of a plurality of power supply circuits which are able to connect in parallel with one another;
   an operation mode detecting means for detecting an operation mode of the load; and
   a power supply circuit selecting means for switching any one of or multiple combinations of the plurality of power supply circuits for supplying power to the load, depending on the operation mode detected by the operation mode detecting means,
   said operation mode detecting means consists of the CPU per se.

2. A power supply according to claim 1, wherein the plurality of power supply circuits are differentiated in a circuit type or power supply capacity.

3. A power supply according to claim 1, wherein the plurality of power supply circuits comprise a first power supply circuit which is a switching regulator circuit type and a second power supply circuit which is a linear regulator circuit type; and wherein the power supply circuit selecting means allows the first power supply circuit and the second power supply circuit to supply power to the load if the operation mode of the load is a full mode or an idle mode, while it allows only the second power supply circuit to supply power to the load if the operation mode is a stop mode.

4. A power supply comprising:

a battery;

a power supply circuit connected with the battery for supplying power to a load with CPU, wherein the power supply circuit consists of a plurality of power supply circuits which are able to connect in parallel with one another;

an operation mode detecting means for detecting an operation mode of the load; and a power supply circuit selecting means for switching any one of or multiple combinations of the plurality of power supply circuits for supplying power to the load, depending on the operation mode detected by the operation mode detecting means, said operation mode detecting means consists of a means for detecting the operation mode of the load in response to a signal issued by the CPU and representing the operation state.

5. A power supply according to claim 4, wherein the plurality of power supply circuits are differentiated in a circuit type or power supply capacity.

6. A power supply according to claim 4, wherein the plurality of power supply circuits comprise a first power supply circuit which is a switching regulator circuit type and a second power supply circuit which is a linear regulator circuit type; and wherein the power supply circuit selecting means allows the first power supply circuit and the second power supply circuit to supply power to the load if the operation mode of the load is a full mode or an idle mode, while it allows only the second power supply circuit to supply power to the load if the operation mode is a stop mode.

* * * * *